Figure 1A:
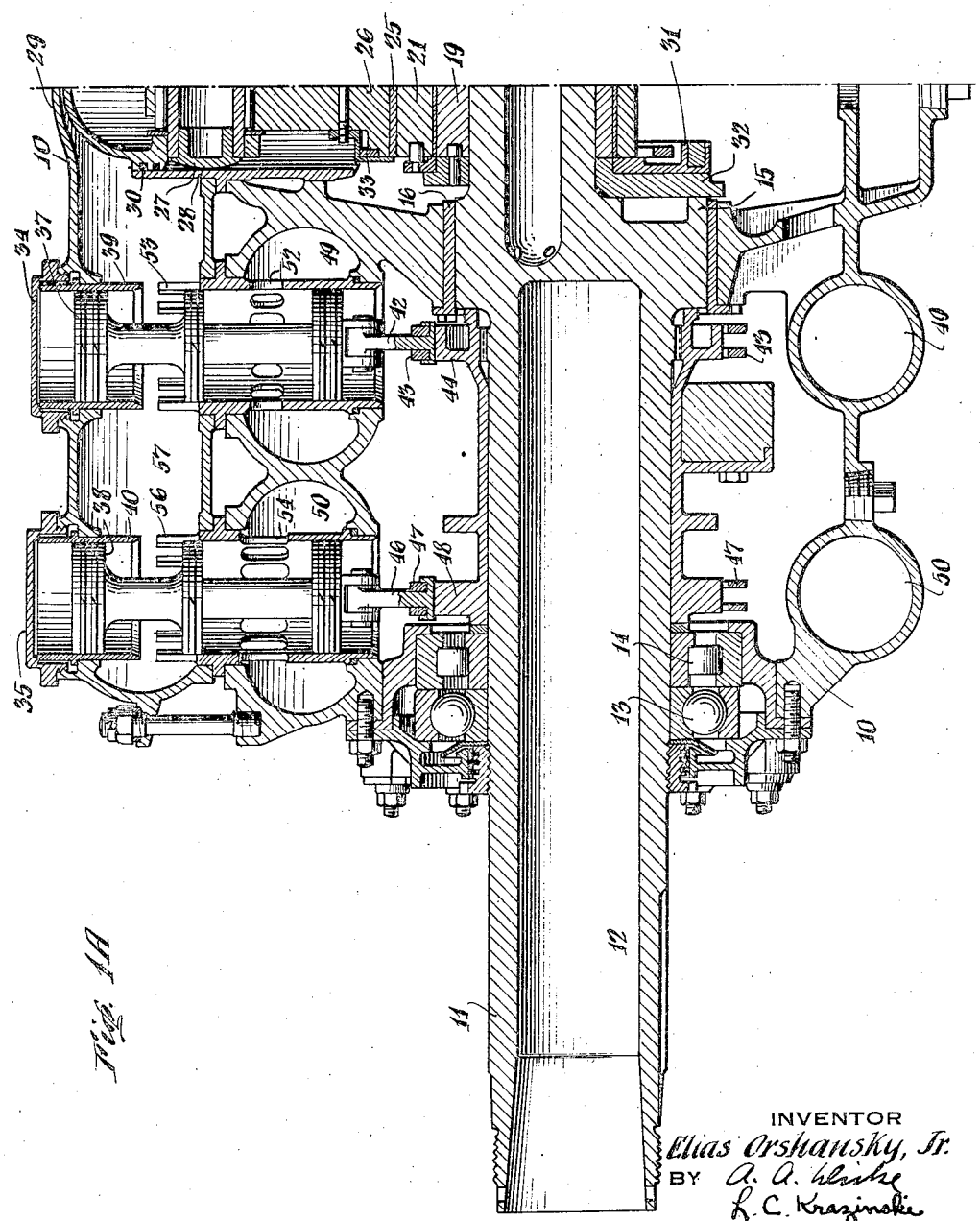

Dec. 14, 1948.  E. ORSHANSKY, JR  2,456,077
HYDRAULIC TRANSMISSION

Filed June 26, 1946  3 Sheets-Sheet 1

INVENTOR
Elias Orshansky, Jr.
BY
ATTORNEYS

Dec. 14, 1948.  E. ORSHANSKY, JR  2,456,077
HYDRAULIC TRANSMISSION

Filed June 26, 1946  3 Sheets-Sheet 2

INVENTOR
Elias Orshansky, Jr.
BY
A. A. plinke
L. C. Krazinski
ATTORNEYS

Dec. 14, 1948.  E. ORSHANSKY, JR  2,456,077
HYDRAULIC TRANSMISSION
Filed June 26, 1946  3 Sheets-Sheet 3

INVENTOR
Elias Orshansky, Jr.
BY
ATTORNEYS

Patented Dec. 14, 1948

2,456,077

UNITED STATES PATENT OFFICE 2,456,077

HYDRAULIC TRANSMISSION

Elias Orshansky, Jr., New York, N. Y., assignor to The Acrotorque Company, Stamford, Conn., a corporation of Connecticut Application June 26, 1946, Serial No. 679,428

9 Claims. (Cl. 103—38)

This invention relates to hydraulic transmissions, particularly to a variable speed transmitting mechanism, and has for its general object to provide an improved arrangement for controlling the piston stroke of a variable displacement hydraulic unit.

Another object of the invention is to provide an improved hydraulic unit in which the stroke of the pistons may be varied by the relative adjustment of two eccentrics.

Still another object of the invention is to provide an improved transmitting mechanism in which variation in piston stroke is achieved through relative displacement of a pair of eccentrics without disarrangement of timing between the working pistons and associated valves.

A further object of the invention is to provide an improved mechanism for controlling the eccentricities of a pair of eccentrics, the relative positions of which determine the stroke at which the pistons operate.

A still further object of the invention is to provide a hydraulically operated gear train including a gear of variable pitch radius for varying the eccentricities of a pair of eccentrics and, in turn, the piston stroke of a hydraulic unit, while at the same time maintaining proper timing between the pistons and associated valves.

With the above objects in view, one embodiment of the invention discloses a variable hydraulic unit of the positive displacement type in which the piston stroke controlling mechanism comprises a pair of rotatable eccentric members, disposed one within the other, the outer eccentric of which is connected on the one hand to the pistons, while both eccentrics on the other hand include gears in mesh engagement with associated gears, which are controlled through a hydraulic servo unit. The outer eccentric rigidly carries a circular gear that meshes with a spiral gear; while the inner eccentric rigidly carries a second circular gear in mesh with an idler gear, which, in turn, meshes with a third circular gear. The spiral and the third circular gears are carried by a common shaft which revolves both gears simultaneously, the outer and inner eccentrics being driven in opposite directions. By virtue of the combination of gears and their direction of rotation, it is possible to vary the overall eccentricity and, in turn, the stroke of the pistons without disturbing the proper timing between the pistons and their associated valves, since the path of eccentricity travelled by the outer eccentric, that is, the center thereof, as it moves from one position to another, follows a straight line, which intersects the center of the shaft on which the eccentric elements are mounted.

Figure 1B:
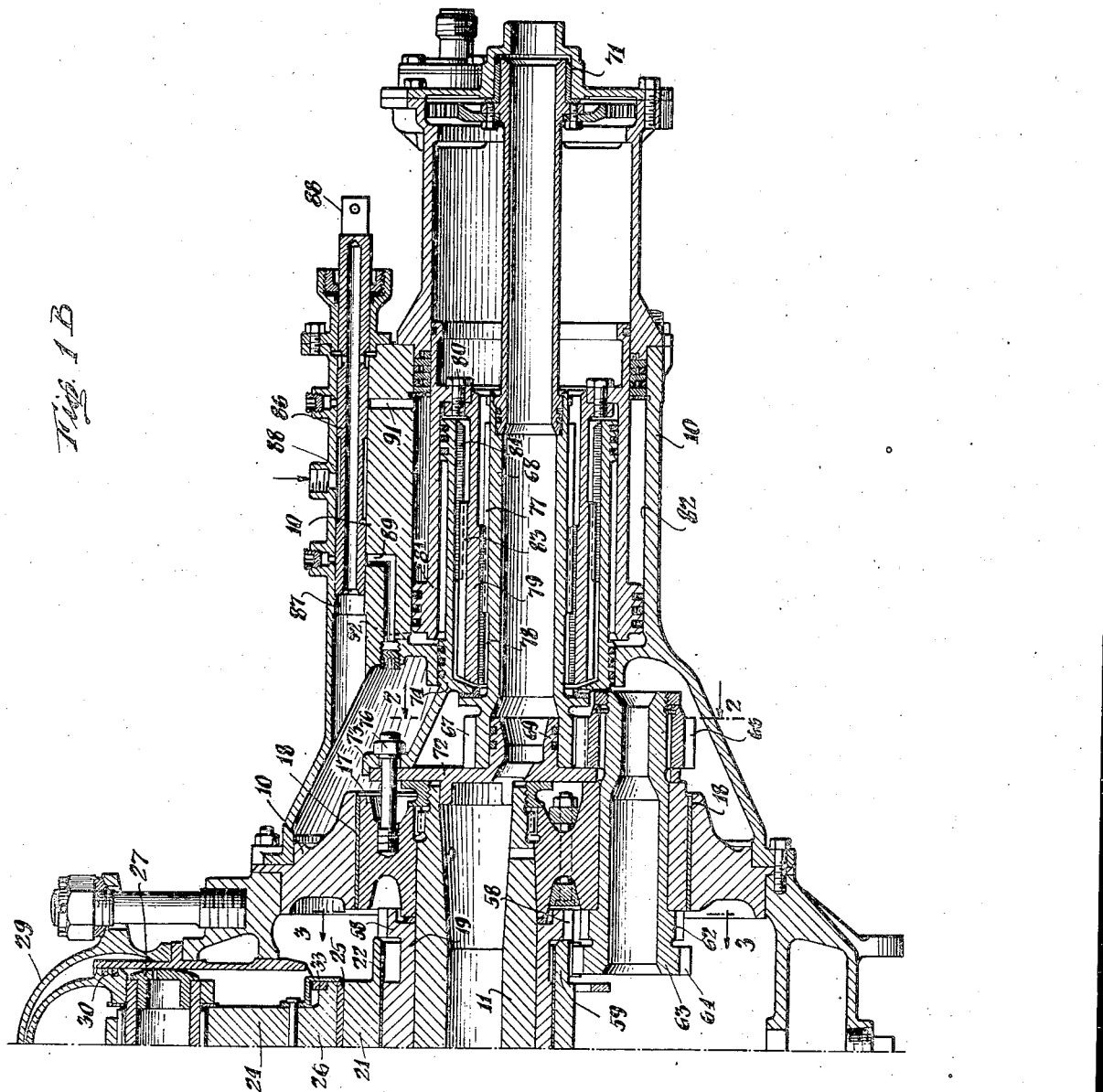
Figure 3:
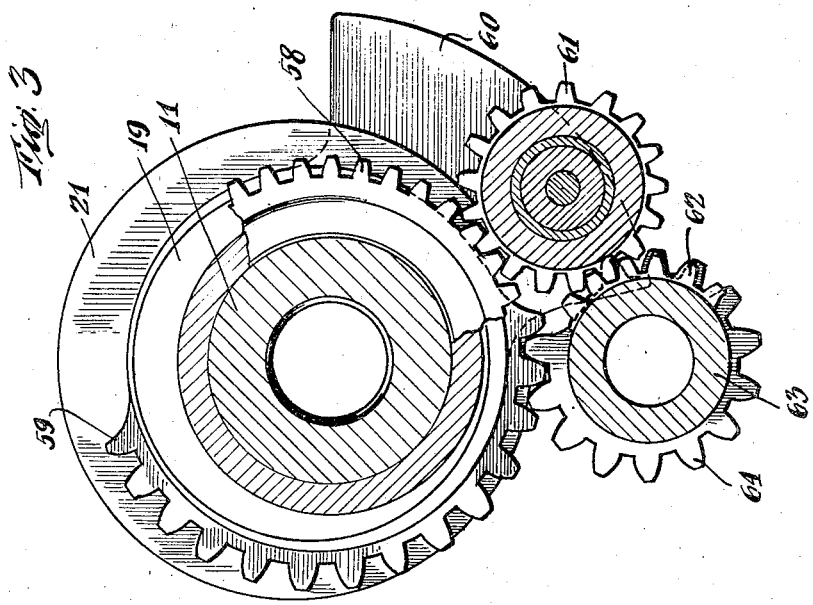
Figure 2:
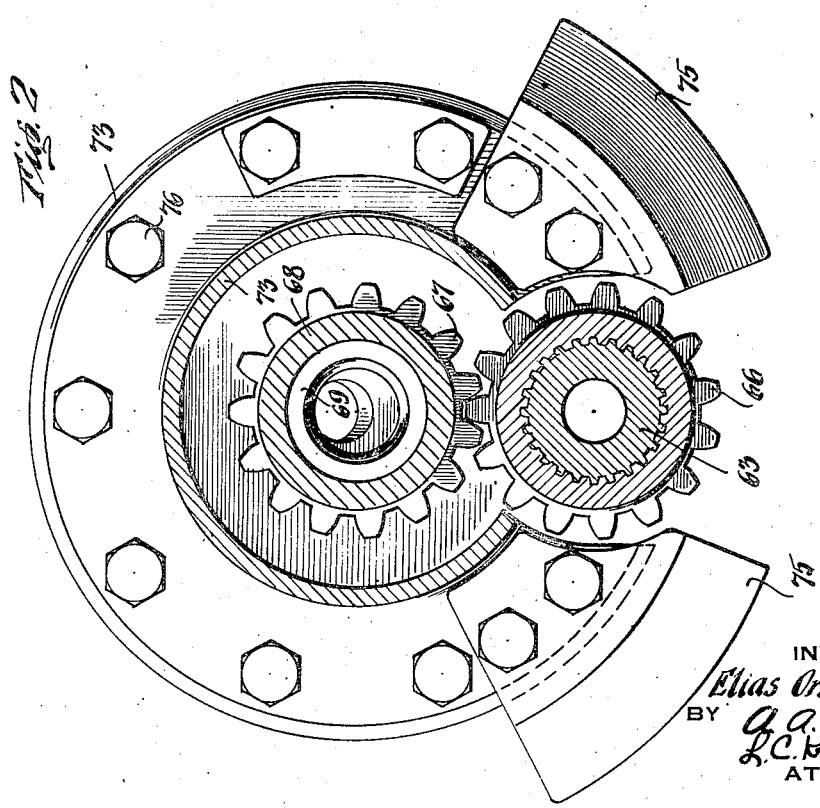

A more complete understanding of this invention will be obtained from the detailed description which follows and by reference to the appended drawings in which:

Figs. 1A and 1B, when abutted at the dot-dash lines, show a longitudinal sectional view of a variable displacement hydraulic unit, Fig. 1A showing the driven shaft with the valves and a portion of the working piston actuated thereby and Fig. 1B showing the remainder of the working piston and mechanism for regulating the stroke thereof;

Fig. 2 is an enlarged sectional view taken along line 2—2 of Fig. 1B, showing an intermediate gear connection in the piston stroke regulating mechanism; and Fig. 3 is an enlarged view, partly in section, taken along line 3—3 of Fig. 1B, showing the two eccentrics and associated gears for regulating the effective positions thereof.

Referring now to the drawings, particularly to Figs. 1A and 1B, there is shown a frame or housing 10 of a variable hydraulic unit, which may be either a pump or motor but which in the description hereinafter will be referred to as a motor merely for purposes of discussion. Within the housing 10 is rotatably supported a shaft 11 that is adapted at its free end to be splined to a driven member (not shown). The driven shaft 11, which is shown with an interior longitudinal opening 12 for reducing the weight thereof and for providing lubrication channels therethrough, is rotatably mounted adjacent its free end upon antifriction bearings 13, 14 secured, as by a press fit engagement, to the frame 10. Intermediate the ends of shaft 11 there is formed an enlarged section 15, which is supported upon an anti-friction bearing 16. The innermost end of the shaft 11 is rigidly connected, as by a splined coupling, to a journal 17, which is supported upon an anti-friction bearing 18 of any suitable material.

Intermediate the anti-friction bearings 16 and 18 on shaft 11 is shown a crank or eccentric 19, which is freely rotatable upon the outer peripheral surface of shaft 11. Upon the outer peripheral surface of eccentric 19 is shown a second or outer eccentric 21, which is freely rotatable around the outer peripheral surface of the inner eccentric 19. Between the outer peripheral surface of eccentric 19 and the inner peripheral surface of eccentric 21 is interposed an anti-friction bearing 22. A connecting rod 24 is formed at one end with the usual slipper member 26, which is provided preferably with an anti-friction bearing 25 for bearing engagement with outer eccentric 21, and at the other end is connected to a piston 27. Piston 27, as shown, is reciprocatingly mounted in a cylinder 28, the cylinder head 29 of which is formed by a portion of the frame 10. Piston rings 30 provide a suitable sealing element for the piston 27 as it moves within the cylinder 28. For balancing the forces developed by the eccentrics 19 and 21, counterweights 31 and 32 are respectively attached thereto in the manner shown. For maintaining the slipper elements 26 and bearing 25 in slidable engagement with outer eccentric 21, retaining rings 33 are shown disposed at the sides thereof.

For controlling flow of liquid to and from the cylinder 28 there are shown an intake valve 34 and an exhaust valve 35 having valve bodies or pistons 37 and 38, respectively, which are reciprocably mounted within cylinders 39 and 40. Valve body 37 is coupled at its inner end to a connecting rod 42, which is slidably connected at its free end by rings 43 to an eccentric member 44 rigidly secured to the external periphery of shaft 11. Valve body 38 is similarly coupled at its inner end to a connecting rod 46, which is slidably connected, as by retaining rings 47, to an eccentric member 48 rigidly connected to shaft 11. Eccentrics 44 and 48, as shown, are preferably formed integral with the shaft 11.

The cylinders 28 and valves 34 and 35 are arranged radially around the shaft 11 and a suitable intake manifold 49 and an outlet manifold 50 are provided in the housing 10 for conducting liquid to and from the hydraulic unit. In intake valve 34 a port 52 is shown connecting the intake manifold 49 with the interior of the valve cylinder 39. An outlet port 53 is also provided in cylinder 39, which port opening is continuous and which connects the interior of cylinder 28 with the exhaust valve 35. Exhaust valve 35 is also formed adjacent its inner end with an outlet port 54, which connects exhaust manifold 50 with the interior of cylinder 40. An inlet port 56 is also provided adjacent the outer end of valve 35 for interconnecting the exhaust manifold 50 and interior of valve 35 with a passage 57 disposed between the valves 34 and 35.

It is to be noted that proper timing in the movement of the valve bodies 37 and 38 should be provided with respect to the movement of the working piston 27, so as to provide intake of liquid and discharge thereof at the proper or optimal moments. To provide this arrangement the valve eccentrics 44 and 48 should be in correct adjustment with the working piston eccentrics 19 and 21. As shown, the working piston 27 is at its top dead center position while both the intake and exhaust valve bodies 37, 38, respectively, are shown at their mid-positions. In other words, for a motor unit further rotation of the shaft 11 will cause valve body 37 to move upwardly in order to permit flow of liquid from manifold 49 through port 52, through the interior of cylinder 39, and then outwardly through port 53 into the interior of cylinder 28, the high pressure liquid driving the piston 27 downwardly. At the same time, valve body 38 will be moving downwardly under the influence of shaft 11, port 56 being further closed to flow of liquid from passage 57 to exhaust or low pressure manifold 50. Of course, in a pump unit the liquid pressure of the manifolds would be reversed, that is, manifold 49 would become the low pressure line and manifold 50 the high pressure line with the valves being actuated in the same sequential manner, as indicated above.

Referring now to Fig. 1B and Fig. 3, the mechanism for varying the stroke of piston 27 will be particularly described. At the right end of inner eccentric 19, as viewed in Fig. 1B, there is shown a gear 58 preferably integral therewith, while at the right end of outer eccentric 21 is provided a gear 59, also preferably integral therewith. Gear 58 is shown as a spur gear of circular contour, that is, of constant pitch radius, and is adapted to mesh with an idler gear 61 (see Fig. 3), which, in turn, meshes with another circular gear 62, which is rigidly carried upon a countershaft 63. Gear 59 is shown also of circular contour and, as seen in Fig. 3, substantially one half of the outer peripheral surface thereof is provided with teeth, a counterweight 60 being provided thereon for balancing the forces acting on shaft 11.

Gear 59 meshes with a gear 64 that is rigidly carried at the inner end of counter shaft 63. In gear 64, however, the pitch radius is of a variable amount, as shown in Fig. 3, the addendum circle thereof preferably following a spiral curve. In actual practice gear 64 was covering substantially 30% of peripheral surface in which the first tooth had a pitch radius of 1.2854 inches and in which the 13th tooth had a pitch radius of 1.1059 inches, the pitch radius of the intermediate teeth lying between said values. Associated gear 59 was formed with 14 teeth covering a peripheral surface of substantially 160° in which the teeth had a constant radius of 2.3774 inches. While only one gear, namely, gear 64, is shown having teeth of variable pitch radii, the invention is not to be limited thereto as gear 59 may also be provided with teeth of variable pitch radii, the over-all variation between the two gears. Further, both gears 59 and 64 may be spirally or elliptically shaped, the requirement, of course, being that the center of the outer eccentric 21 must move in a straight line, as will be discussed in more detail hereinafter.

It is thus seen that rotation of countershaft 63 will impart to gear 59 one direction of rotation while to gear 58 a reverse direction of rotation and, in consequence, since the gears are respectively movable with outer eccentric 21 and inner eccentric 19, both eccentrics will move in opposite directions. The combination of said variable pitch radius and constant pitch radius is such, though, that movement imparted thereby to the eccentrics will cause the center of the outer eccentric 21 to follow a straight path as the outer eccentric 21 is moved from its outermost position to its neutral position and thence from its neutral position to its reverse outermost position. It is to be noted that the two superposed, relatively rotatable, eccentrics will always result in a total eccentricity, which is made up of the two single eccentrics and which varies in accordance with the relative rotation of the two eccentrics. Thus referring to Fig. 3, when the outer eccentric 21 and inner eccentric 19 have their axes or centers at the top, which is the position now shown in Fig. 3, resultant movement from said top position under control of said gears is such that the center of the outer eccentric 21, which is identical with the total eccentricity of the two eccentrics and which represents the crank arm that produces the stroke of working piston 27, will always intersect the center of the shaft 11. Thus when both eccentrics 21 and 19 have been turned 90°, the resultant eccentricity produced thereby is zero. In other words, the working piston 27 will be then disposed in its neutral position and the axis of outer eccentric 21 will coincide with that of the shaft 11. Further rotation of the eccentrics will shift the total eccentricity thereof in the reverse direction until a maximum point is reached. It will be thus obvious that in the entire movement from one maximum position, say a positive position, to the other, or negative maximum position, the path traced by the center of the outer eccentric will be a straight line between these two points, which line will intersect the center of shaft 11. This movement is a necessary requirement in order to maintain proper timing between the eccentrics 44 and 48 of the valves on the one hand and the combined eccentrics 21 and 19 of the working piston 27 on the other hand.

Countershaft 63 is rigidly coupled to journal 17, so that as the shaft 11 rotates, journal 17, countershaft 63, and shaft 11 rotate as a single unit, the entire unit being journaled in the antifriction bearing 18, which, in turn, is secured to the frame 10. At the outer end of the countershaft 63 is rigidly secured thereto a gear 66, such as by a splined connection (see Fig. 1B and Fig. 2). Gear 66 is shown in mesh engagement with a gear 67, mounted upon a rotatable hollow shaft 68, which at one end, that is, its inner end, is freely supported upon a pilot shaft 69 rigidly secured to shaft 11, while at the other end it is supported upon a bushing 71. Pilot shaft 69 is shown formed integral with a flange member 72, which, with a flange 73 of a hollow sleeve 74, is rigidly coupled to the journal 17 in any suitable manner, as by a bolt-nut combination 76. To preserve a balance of forces counterweights 75 are provided, as shown in Fig. 2. Adjacent the inner end of shaft 68 are provided splines 77, preferably of helical outline, on the outer peripheral surface thereof. In mesh engagement with helical splines 77 are shown straight splines 78 formed on the inner peripheral surface of a sleeve 79, which is rigidly coupled at its outer end, as by a bolt 80, to a hollow piston 81 adapted for longitudinal movement within a cylinder 82 formed within the housing 10. At the outer peripheral surface of sleeve 79 are formed splines 83 which mesh with splines 84 formed on the interior surface of sleeve member 74. It is thus seen that, while the eccentrics 21 and 19 are freely mounted on shaft 11, they are rigidly connected and movable with shaft 11 through the connections consisting of gears 58, 61, 62 and gears 59 and 64, respectively coupled to eccentrics 19 and 21 and thence through shaft 63, gears 66, 67, shaft 68, splines 77, 78, sleeve 79, splines 83, 84, and sleeve 74, through flange 73, bolt 76, and finally through journal 17 to shaft 11.

While the hereinbefore described combination rotates with the shaft 11, longitudinal movement may be imparted to the hollow piston 81 through a hydraulic servo arrangement, as shown in Fig. 1B. This arrangement comprises an actuating valve body 86 reciprocably movable in a sleeve or cylinder 87 by a manually or automatically controlled lever (not shown) of any suitable type connected to an arm 88 at the outer extremity of valve body 86. In the sleeve 87 are provided an inlet port 88 and ports 89, 91, providing inlet or outlet passages in the housing 10, depending upon the position of the valve body 86. In the position shown, the piston 81 is at its extreme left position, as viewed in Fig. 1B. To move the piston 81 longitudinally to the right, the valve body 86 is moved to the left until a recess 90 provided in the periphery thereof is in registration with port 89. Liquid will then flow from the inlet port 88 through recess 90, inlet port 89, passage 92 formed in the housing 10, and thence into cylinder 82 against the head of piston 81, which, as a result, is moved to the right. Movement of the piston 81 to the right may be interrupted at any position intermediate its full right position by merely returning the valve body 86 to the neutral or middle position, the piston being locked in its intermediate position by the liquid on both sides of the piston head.

Assume from the above operation that the piston 81 has been moved a fraction of the distance to the right. This movement will produce a corresponding longitudinal movement in sleeve 79, which is rigidly coupled to the piston 81 by bolt 80. The straight splines 78 on the inner surface of sleeve 79 will impart a rotative movement to shaft 68 in view of their mesh engagement with the helical splines 77 thereon. Rotation of shaft 68 thereupon produces a like rotation in gear 67, which is transmitted through gear 66 and countershaft 63 to gears 58, 59 via the hereinbefore-traced gear train. The rotation imparted to gears 58 and 59 produces a corresponding rotation or adjustment of the eccentrics 19, 21, thereby changing the angular relationship of the eccentrics and, in turn, the disposition or stroke of the working piston 27. Since the eccentrics 19, 21 are shown in Fig. 1B at maximum eccentricity, the change in angular relationship described above will provide a reduction in the working piston stroke. Further movement of the servo piston 81 to the right under control of valve body 86 will produce a further decrease in the stroke of the working piston 81, while a reverse movement, that is, to the left, of the servo piston 81 will produce an opposite movement to the parts with resultant increase in the piston stroke. It is thus readily apparent that an improved arrangement is provided for varying the working piston stroke without disturbance to the timing between the valves 34, 35 and working piston 27.

While what has been described hereinbefore represents a preferred embodiment of the invention, it will be obvious to those skilled in the art that various changes and modifications may be made without departing from the spirit or scope of the invention as clearly set forth in the appended claims.

What is claimed is:

1. A mechanism for varying the stroke of a reciprocating piston comprising, in combination, a rotatable shaft, an eccentric freely rotatable upon said shaft, a second eccentric freely rotatable upon said first eccentric, said second eccentric being connected to said piston, a gear rigidly coupled to said first eccentric, an elliptical gear rigidly coupled to said second eccentric, a second elliptical gear in mesh engagement with said first elliptical gear, a second gear including an idler gear coupled to said first gear for imparting reverse rotation to said first gear, a common shaft for rigidly carrying said second gears, the rotation of said gears producing concurrent and opposite rotation of said eccentrics, and means for rotating said common shaft in either direction.

2. In a mechanism of the type wherein motion is translated from one form to another, a driving member, a driven member, eccentric means for transmitting motion from the driving member to the driven member, said eccentric means comprising a pair of eccentrics, one of said eccentrics having bearing engagement with the driving member and the other of said eccentrics being coupled to said driven member, and means for controlling the relative angular displacement of said eccentrics, said controlling means including a circular gear having teeth on substantially one-half of its periphery, said gear being carried by and movable with said other eccentric, a spiral gear in mesh engagement with said first gear, a second circular gear carried by and movable with said first eccentric, means including a third circular gear so connected to said second circular gear as to reverse rotation of said second circular gear, and hydraulic means including a common shaft carrying said spiral and third gears for regulating the displacement of said eccentrics.

3. In a mechanism of the type where motion is connected from one form to another, a driving member, a driven member, eccentric means for transmitting motion from the driving member to the driven member, said eccentrici means comprising a pair of independently rotatable eccentrics in which one is disposed within the other, the outer and inner eccentrics having bearing engagement respectively with the driving and driven members, and means for controlling the relative displacement of said eccentrics, said controlling means including a gear having teeth on one-half of its periphery arranged in the form of a spiral, said spiral gear being carried by and movable with said outer eccentric, a second spiral gear in mesh engagement with said first spiral gear, a circular gear carried by and movable with said inner eccentric, a second circular gear so connected to said first circular gear as to reverse rotation of said first circular gear, and hydraulic means including a common shaft carrying said second gears for regulating the angular displacement of said eccentrics.

4. In a mechanism of the type where motion is connected from one form to another, a reciprocating piston, a shaft driven by said piston, eccentric means for transmitting motion from the piston to the shaft, said eccentric means comprising a pair of eccentrics disposed one within the other, said outer eccentric being articulated by said piston, said inner eccentric being carried by said shaft, said inner and outer eccentrics being relatively movable with respect to said shaft, and means for controlling the relative displacement of said eccentrics, said controlling means including an elliptical gear rigidly carried by said outer eccentric, a second elliptical gear in mesh engagement with said first elliptical gear, a circular gear carried by said inner eccentric, a second circular gear so connected to said first circular gear as to reverse rotation of said first circular gear, and hydro-mechanical means including a common shaft carrying said second gears for regulating the displacement of said eccentrics.

5. A mechanism comprising, in combination, a plurality of cylinders; a plurality of pistons having strokes of variable length reciprocable within said cylinders; connecting rods associated with said pistons; an assembly including a pair of eccentrics, one of which is disposed within the other, connected to said rods for varying the piston stroke; said eccentrics being freely rotatable with respect to each other; and means for controlling the rotation of said eccentrics, said controlling means including a gear having teeth on one-half of its periphery arranged in the form of a spiral; said spiral gear being carried by one of said eccentrics; a second spiral gear in mesh engagement with said first spiral gear; a circular gear carried by the other of said eccentrics; a second circular gear so connected to said first circular gear as to reverse rotation thereof; and hydraulic means including a common shaft carrying said second gears for regulating the angular displacements of said eccentrics; whereby the stroke of said pistons is accordingly varied.

6. A variable hydraulic unit comprising, in combination, a cylinder, a piston reciprocable therein, valve means for regulating flow of liquid to and from said cylinder, an eccentric assembly connected to said piston for varying the stroke thereof, a shaft for carrying the eccentric assembly, said assembly including an outer eccentric and an inner eccentric, a reciprocating valve body for said valve means carried by said shaft, said valve body being actuated in timed relationship with said piston, spiral gear means for providing angular adjustment of said outer eccentric, and circular gear means for providing angular adjustment of said inner eccentric, the movement of said spiral and circular means being such as to cause the center of said outer eccentric to travel along a straight line and thereby preserve the proper timing between said valve means and piston.

7. A variable hydraulic unit comprising, in combination, a cylinder, a piston reciprocable therein, an intake valve and an exhaust valve for regulating flow of liquid to and from said cylinder, an eccentric assembly connected to said piston for varying the stroke thereof, a shaft for carrying the eccentric assembly, said assembly including an outer eccentric and an inner eccentric freely movable within said outer eccentric, a reciprocating valve body for each of said valves carried by said shaft, said valve bodies being actuated in timed relationship with said piston, variable pitch gear means for providing angular adjustment of said outer eccentric, circular gear means for providing angular adjustment of said inner eccentric, said gear means being adapted to move said eccentrics in such manner that the center of said outer eccentric is caused to travel along a straight line substantially perpendicular to said shaft, thereby preserving the proper timing between said valve bodies and piston, and means for rigidly connecting said gear means to said shaft.

8. A hydraulic unit of variable piston stroke comprising, in combination, a shaft, an inner eccentric freely rotatable on said shaft, an outer eccentric freely rotatable on said inner eccentric, said outer eccentric being operatively connected to said piston for imparting a predetermined stroke thereto, a gear of constant pitch radius carried by and rotatable with said outer eccentric, a gear of variable pitch radius in mesh engagement with said first gear, a second gear of constant pitch radius carried by and rotatable with said inner eccentric, a third gear of constant pitch radius including an idler gear for reversing direction of rotation of said second gear of constant pitch radius, and means for controlling the relative movement of said eccentrics, said means comprising a second shaft for rigidly carrying said gear of variable pitch radius and said third gear of constant pitch radius, a third shaft provided with a helical spline connected to said second shaft, a rotatable sleeve member with a straight spline in mesh engagement with said helical spline, a servo-piston connected to said sleeve for imparting translatory motion thereto, and hydraulic means for controlling the position of said piston.

9. A hydraulic unit comprising, in combination, a shaft, a piston of variable stroke carried thereby, an inner eccentric freely rotatable on said shaft, an outer eccentric freely rotatable on said inner eccentric, said outer eccentric being operatively connected to said piston for imparting a predetermined stroke thereto, a spiral gear carried by and rotatable with said outer eccentric, a second spiral gear in mesh engagement with said first spiral gear, a circular gear carried by and rotatable with said inner eccentric, a second circular gear including an idler gear for reversing rotation of said first circular gear, means for controlling relative movement of said eccentrics, said means comprising a second shaft for rigidly carrying said second gears, a third shaft provided with a helical spline connected to and rotatable with said second shaft, a rotatable sleeve member with a straight spline in mesh engagement with said helical spline, a piston rigidly connected to said sleeve for imparting translatory motion thereto, and means including a second sleeve interconnecting said first sleeve and said first shaft for rigidly coupling said eccentrics to said first shaft.

ELIAS ORSHANSKY, Jr.

REFERENCES CITED

The following references are of record in the file of this patent:

UNITED STATES PATENTS

| Number | Name | Date |
| --- | --- | --- |
| 1,149,728 | Ciarlo | Aug. 10, 1915 |
| 1,212,791 | Manly | Jan. 16, 1917 |
| 1,283,249 | Manly | Oct. 29, 1918 |
| 1,719,693 | Ernst | July 2, 1929 |
| 2,316,115 | Thompson | Apr. 6, 1943 |
| 2,348,958 | Celio | May 16, 1944 |